Patented July 25, 1939

2,167,414

UNITED STATES PATENT OFFICE 2,167,414

STIFFENED FABRIC FOR AIRPLANE WINGS

Wyly M. Billing, Wilmington, Del., assignor to Hercules Powder Company, Wilmington, Del., a corporation of Delaware No Drawing. Application December 8, 1937, Serial No. 178,809

6 Claims. (Cl. 91—68)

This invention relates to a stiffened fabric for use in the construction of airplane wings and like articles, and more particularly to a stiffened fabric impregnated with cellulose acetobutyrate or cellulose acetopropionate.

A common type of airplane wing as heretofore constructed has comprised a flexible fabric arranged on a rigid supporting framework, and stiffened and made relatively impervious to moisture by being impregnated and coated with a solution of nitrocellulose, commonly referred to as a "dope". Such stiffened fabric wings were open to the great objection of being very inflammable and also were subject to deterioration on exposure to light.

It has been proposed to overcome these disadvantages by use of a solution of cellulose acetate as the impregnating and coating material. However, airplane wing fabrics stiffened with cellulose acetate dopes are water-sensitive and the cellulose acetate film tends to loosen and separate on long exposure to moisture. Moreover, cellulose acetate dopes require control of humidity conditions during their application and drying in order to prevent impairment of the film.

In accordance with this invention there is provided a stiffened fabric suitable for airplane wing construction comprising a flexible fabric, for example, linen, etc., impregnated and/or coated with a composition including cellulose acetopropionate or cellulose acetobutyrate. Such fabrics are non-inflammable and resistant to light, water and weathering, and are superior to any similar materials heretofore employed.

The cellulose acetopropionate or cellulose acetobutyrate for use in accordance with this invention may be produced by any of the well known processes for their formation. Advantageously, cellulose acetopropionate or cellulose acetobutyrate may be subjected to hydrolysis treatment before being used; the hydrolysis may be carried out by heating the mixed ester after its formation in the presence of an acid corresponding to an acid radical of the ester, as is more fully described in patent application, Serial No. 737,407, filed July 28, 1934, by John S. Tinsley.

More specifically the cellulose acetobutyrate or cellulose acetopropionate used in accordance with this invention in impregnating fabric will comprise a cellulose ester containing a minimum of 0.5 and a maximum of 2.5 mols of acetyl radical, and a minimum of 0.5 and a maximum of 2.5 mols of butyryl or propionyl radical, the total combined organic acid radicals being within the range of 2.2 to 3 mols per unit of anhydroglucose ($C_6H_{10}O_5$).

If, however, I subject the cellulose mixed ester to hydrolysis, as hereinbefore set forth, the upper limit of acyl radical content of the hydrolyzed mixed ester will be slightly below 3.0 mols of acyl radical per unit of anhydroglucose.

The impregnating composition for use in stiffening fabrics in accordance with this invention comprises cellulose acetobutyrate or cellulose acetopropionate and a solvent or solvent mixture therefor. As solvents, ethylene dichloride, ethyl acetate, ethyleneglycolmonomethylether acetate, ethyl lactate, etc., or mixtures thereof will be suitable. Preferably a plasticizer, as, for example, triphenyl phosphate, dibutyl phthalate, triethyl citrate, etc., will be included in the composition. Resins, such as, ester gum, dammar, polybasic acid-polyhydric alcohol resins and pigments, such as, aluminum bronze, etc., may also be added. The relative amounts of the respective ingredients may vary widely to give a composition of the desired covering power, viscosity, etc., for application in the manner selected.

The following formulae illustrate compositions suitable for use in accordance with my invention:

| Ingredients | Parts by weight | | |
|---|---|---|---|
| | A | B | C |
| Cellulose acetobutyrate | 9 | 9 | 9 |
| Triphenyl phosphate | 1 | 1 | 3 |
| Dibutyl phthalate | | 1 | |
| Solvent (see below) | 90 | 89 | 88 |

| Solvent composition | Parts by weight |
|---|---|
| Ethylene dichloride | 40 |
| Ethylene glycol monomethyl ether acetate | 30 |
| Ethyl lactate | 10 |
| Toluol | 20 |

The stiffening compositions may be applied to the fabric, already in place on the supporting frame of the airplane wing, by brushing, spraying, or other known method of application. When dry the fabric will be found to be taut, resilient, non-inflammable, weather-resistant, impermeable, and admirably adapted for the purpose for which it is intended.

The following data show comparative values obtained under identical conditions for fabrics stiffened with prior art dopes and for fabrics produced in accordance with this invention. A determination was made of the moisture permeability of cloth panels covered with nitrocellulose, cellulose acetate, and acetobutyrate dopes made up on Formula A above, after three months' outdoor exposure at 45° from the horizontal facing south. The results follow:

| Base of dope | Permeability g./cm³/hr. | Appearance |
|---|---|---|
| Nitrocellulose | $2.94 \times 10^{-4}$ | Discolored, brittle. |
| Cellulose acetate | $8.08 \times 10^{-4}$ | Dull, weathered. |
| Cellulose acetobutyrate* | $2.39 \times 10^{-4}$ | Glossy, flexible. |

*In accordance with this invention.

The superiority of the fabric produced in accordance with this invention is evident.

The fact that a mixed cellulose ester, such as the cellulose acetobutyrate and cellulose acetopropionate used in accordance with this invention does not have the same properties and is not adapted for the same uses as would be a mere mechanical mixture of cellulose acetate plus cellulose butyrate or a mere mechanical mixture of cellulose acetate plus cellulose propionate may be illustrated by dissolving cellulose acetate and cellulose butyrate in a common solvent, such as, a mixture of methylene dichloride, β-trichloroethane and ethanol and casting a film in the usual manner by the use of such solution. The film will be found to be gelled due to the incompatibility of the two said cellulose esters and no useful film will be so obtained. On the other hand, when using as the cellulose ester, cellulose acetobutyrate dissolved, for example, in ethylene dichloride and casting a film in the same manner by the use of said solution, a homogeneous, clear, transparent, tough, flexible and useful film will be attained.

It will be understood that the details and examples hereinbefore set forth are for illustrative purposes only and in no way limit the invention as herein broadly described and claimed.

This application constitutes a continuation-in-part of my application, Serial No. 10,031, filed March 8, 1935, for Stiffened fabric for airplane wings.

What I claim and desire to protect by Letters Patent is:

1. A stiffened fabric, characterized by tautness and resistance to light, water and weathering and suitable for use in the construction of airplane wings, comprising a normally flexible fabric impregnated with a composition comprising a chemically mixed organic ester of cellulose from the group consisting of cellulose acetopropionate and cellulose acetobutyrate, said mixed ester of cellulose containing from 0.5 mols to 2.5 mols of acetyl radical and from 0.5 mols to 2.5 mols of a higher acyl radical and having a total acyl radical content of 2.2 to 3 mols per unit of anhydroglucose ($C_6H_{10}O_5$).

2. A stiffened fabric, characterized by tautness and resistance to light, water and weathering and suitable for use in the construction of airplane wings, comprising a normally flexible fabric impregnated with a composition comprising a plasticizer and a chemically mixed organic ester of cellulose from the group consisting of cellulose acetopropionate and cellulose acetobutyrate, said mixed ester of cellulose containing from 0.5 mols to 2.5 mols of acetyl radical and from 0.5 mols to 2.5 mols of the higher acyl radical and having a total acyl radical content of 2.2 to 3 mols per unit of anhydroglucose ($C_6H_{10}O_5$).

3. A stiffened fabric, characterized by tautness and resistance to light, water and weathering and suitable for use in the construction of airplane wings, comprising a normally flexible fabric impregnated with a composition comprising a plasticizer, a resin, and a chemically mixed organic ester of cellulose from the group consisting of cellulose acetopropionate and cellulose acetobutyrate, said mixed ester of cellulose containing from 0.5 mols to 2.5 mols of acetyl radical and from 0.5 mols to 2.5 mols of higher acyl radical and having a total acyl radical content of 2.2 to 3 mols per unit of anhydroglucose ($C_6H_{10}O_5$).

4. A stiffened fabric, characterized by tautness and resistance to light, water and weathering and suitable for use in the construction of airplane wings, comprising a normally flexible fabric impregnated with a composition comprising a plasticizer, a resin, and a hydrolyzed chemically mixed organic ester of cellulose from the group consisting of cellulose acetoproprionate and cellulose acetobutyrate, said mixed ester of cellulose containing from 0.5 mols to 2.5 mols of acetyl radical and from 0.5 mols to 2.5 mols of higher acyl radical and having a total acyl radical content of 2.2 to slightly below 3.0 mols per unit of anhydroglucose ($C_6H_{10}O_5$).

5. A stiffened fabric, characterized by tautness and resistance to light, water and weathering and suitable for use in the construction of airplane wings, comprising a normally flexible fabric impregnated with a composition comprising cellulose acetobutyrate, said cellulose acetobutyrate containing from 0.5 mols to 2.5 mols of acetyl radical and from 0.5 mols to 2.5 mols of butyryl radical and having a total acyl radical content of 2.2 to 3 mols per unit of anhydroglucose ($C_6H_{10}O_5$).

6. A stiffened fabric, characterized by tautness and resistance to light, water and weathering and suitable for use in construction of airplane wings, comprising a normally flexible fabric impregnated with a compositon including cellulose acetobutyrate and a plasticizer, the plasticizer being present in amount not substantially in excess of three parts by weight to nine parts by weight of cellulose acetobutyrate, said cellulose acetobutyrate containing from 0.5 mols to 2.5 mols of acetyl radical and from 0.5 mols to 2.5 mols of butyryl radical and having a total acyl content of 2.2 to 3 mols per unit of anhydroglucose ($C_6H_{10}O_5$).

WYLY M. BILLING.